United States Patent
Hama et al.

(10) Patent No.: US 12,077,943 B2
(45) Date of Patent: Sep. 3, 2024

(54) REMOTE OPERATION ASSISTANCE SERVER, REMOTE OPERATION ASSISTANCE METHOD, AND REMOTE OPERATION ASSISTANCE SYSTEM

(71) Applicant: KOBELCO CONSTRUCTION MACHINERY CO., LTD., Hiroshima (JP)

(72) Inventors: Ryota Hama, Hiroshima (JP); Hitoshi Sasaki, Hiroshima (JP); Seiji Saiki, Hiroshima (JP); Yoichiro Yamazaki, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 266 days.

(21) Appl. No.: 17/780,761

(22) PCT Filed: Aug. 12, 2020

(86) PCT No.: PCT/JP2020/030677
§ 371 (c)(1),
(2) Date: May 27, 2022

(87) PCT Pub. No.: WO2021/111677
PCT Pub. Date: Jun. 10, 2021

(65) Prior Publication Data
US 2022/0412047 A1    Dec. 29, 2022

(30) Foreign Application Priority Data
Dec. 3, 2019   (JP) .................................. 2019-218674

(51) Int. Cl.
*E02F 9/20*     (2006.01)
*G05D 1/00*     (2024.01)
(Continued)

(52) U.S. Cl.
CPC ........... *E02F 9/205* (2013.01); *G05D 1/0016* (2013.01); *G05D 1/0022* (2013.01);
(Continued)

(58) Field of Classification Search
CPC ..... E02F 9/205; G05D 1/0016; G05D 1/0022; G05D 1/0038; G05D 1/005; H04W 4/40; H04W 4/80; G08C 17/02
See application file for complete search history.

(56) References Cited

U.S. PATENT DOCUMENTS

2010/0250023 A1    9/2010  Gudat
2016/0348504 A1*  12/2016  Hanski .................... E02F 9/205
(Continued)

FOREIGN PATENT DOCUMENTS

CN    106592677 A    4/2017
JP    106-228988 A   8/1994
(Continued)

OTHER PUBLICATIONS

The extended European Search Report dated Nov. 18, 2022 issued in the corresponding EP Patent Application No. 20895146.7.

*Primary Examiner* — Rodney A Butler
(74) *Attorney, Agent, or Firm* — Carrier, Shende & Associates P.C.; Joseph P. Carrier; Fulchand P. Shende

(57) ABSTRACT

There is provided a system and the like capable of assisting remote operation of a work machine performed by a remote operator in such a way that contact between the work machine and an actual machine operator and other unfavorable situations can be avoided. Even in a situation in which a first evaluation result is affirmative and a work machine 40 can be remotely operated via a remote operation apparatus 20, but in a situation in which a second evaluation result is affirmative and it is highly probable that a worker carrying a portable terminal 60, such as an actual machine operator (Continued)

OP2, is so close to the work machine 40 or on the work machine 40 that short-range wireless communication between the work machine 40 and the portable terminal 60 is established, remote operation of the work machine 40 is inhibited.

8 Claims, 6 Drawing Sheets

(51) Int. Cl.
     *H04W 4/40*          (2018.01)
     *H04W 4/80*          (2018.01)

(52) U.S. Cl.
     CPC ........... *G05D 1/0038* (2013.01); *G05D 1/005* (2013.01); *H04W 4/40* (2018.02); *H04W 4/80* (2018.02)

(56) References Cited

U.S. PATENT DOCUMENTS

2018/0143625 A1    5/2018   Nelson et al.
2019/0302760 A1*  10/2019  Katou ................. G05D 1/0061

FOREIGN PATENT DOCUMENTS

| JP | H06-228988 A | 8/1994 |
| JP | 2003-329007 A | 11/2003 |
| JP | 2015-209718 A | 11/2015 |
| JP | 2016-076801 A | 5/2016 |
| JP | 2018-012951 A | 1/2018 |
| JP | 2020-105879 A | 7/2020 |

\* cited by examiner

REMOTE OPERATION ASSISTANCE SERVER, REMOTE OPERATION ASSISTANCE METHOD, AND REMOTE OPERATION ASSISTANCE SYSTEM

TECHNICAL FIELD

The present invention relates to a server and a system that assist remote operation of a work machine via a remote operation apparatus.

BACKGROUND ART

A technology for remotely operating a work machine has been proposed (see Patent Literature 1, for example).

CITATION LIST

Patent Literature

Patent Literature 1: Japanese Patent Laid-Open No. 2016-076801

SUMMARY OF INVENTION

Technical Problem

When a work machine (actual machine) is remotely operated by a remote operator and is likely to be further operated by an actual machine operator on the work machine, however, the remote operation of the work machine performed by the remote operator in a situation in which the actual machine operator is about to get on the work machine may cause unexpected situations, such as contact between the work machine and the actual machine operator.

An object of the present invention is to provide a system and the like capable of assisting remote operation of the work machine performed by the remote operator in such a way that contact between the work machine and the actual machine operator and other unfavorable situations can be avoided.

Solution to Problem

A remote operation assistance server according to the present invention comprises an evaluation result recognition element that communicates with a work machine comprising an actual machine operation mechanism and a mode switching mechanism that switches an actual machine operation mode in which the work machine is operated in accordance with an operation aspect of the actual machine operation mechanism to a remote operation mode in which the work machine is operated in accordance with an operation aspect of a remote operation mechanism that forms a remote operation apparatus and vice versa, recognizes as a first evaluation result a result of evaluation of whether or not the mode switching mechanism has switched the operation mode to the remote operation mode, based on the communication, and recognizes as a second evaluation result a result of evaluation of whether or not short-range wireless communication between the work machine and a portable terminal has been established, based on the communication, a first assistance processing element that carries out a first assistance process of permitting remote operation of the work machine using the remote operation apparatus based on communication with each of the remote operation apparatus and the work machine when the first evaluation result recognized by the evaluation result recognition element is affirmative and the second evaluation result recognized by the evaluation result recognition element is negative, and a second assistance processing element that carries out a second assistance process of prohibiting remote operation of the work machine using the remote operation apparatus when the first and second evaluation results recognized by the evaluation result recognition element are affirmative.

A remote operation assistance system according to the present invention comprises the remote operation assistance server according to the present invention, the work machine, and the portable terminal.

The remote operation assistance server and the remote operation assistance system (hereinafter referred to as "remote operation assistance server and the like") having the configuration described above recognize a first evaluation result and a second evaluation result. The phrase "recognizing evaluation results" is a concept that encompasses not only carrying out an evaluation process as an evaluation processing element to acquire a result of the evaluation, but also acquiring the result of the evaluation performed by the evaluation processing element directly from the evaluation processing element or acquiring the result indirectly via a storage device such as a database.

In a situation in which the first evaluation result is affirmative and the work machine can be remotely operated via the remote operation apparatus, and further in a situation in which the second evaluation result is negative and it is highly probable that a worker carrying the portable terminal, such as the actual machine operator, is so far away from the work machine that the short-range wireless communication between the work machine and the portable terminal is not established, remote operation of the work machine is permitted. On the other hand, even in the situation in which the first evaluation result is affirmative and the work machine can be remotely operated via the remote operation apparatus, but in a situation in which the second evaluation result is affirmative and it is highly probable that a worker carrying the portable terminal, such as the actual machine operator, is so close to the work machine or on the work machine that the short-range wireless communication between the work machine and the portable terminal is established, remote operation of the work machine is inhibited. Remote operation of the work machine performed by the remote operator can thus be assisted while unexpected situations, such as contact between the work machine and the actual machine operator, are avoided.

DESCRIPTION OF EMBODIMENT (Configuration of Remote Operation Assistance System)

Figure 1:
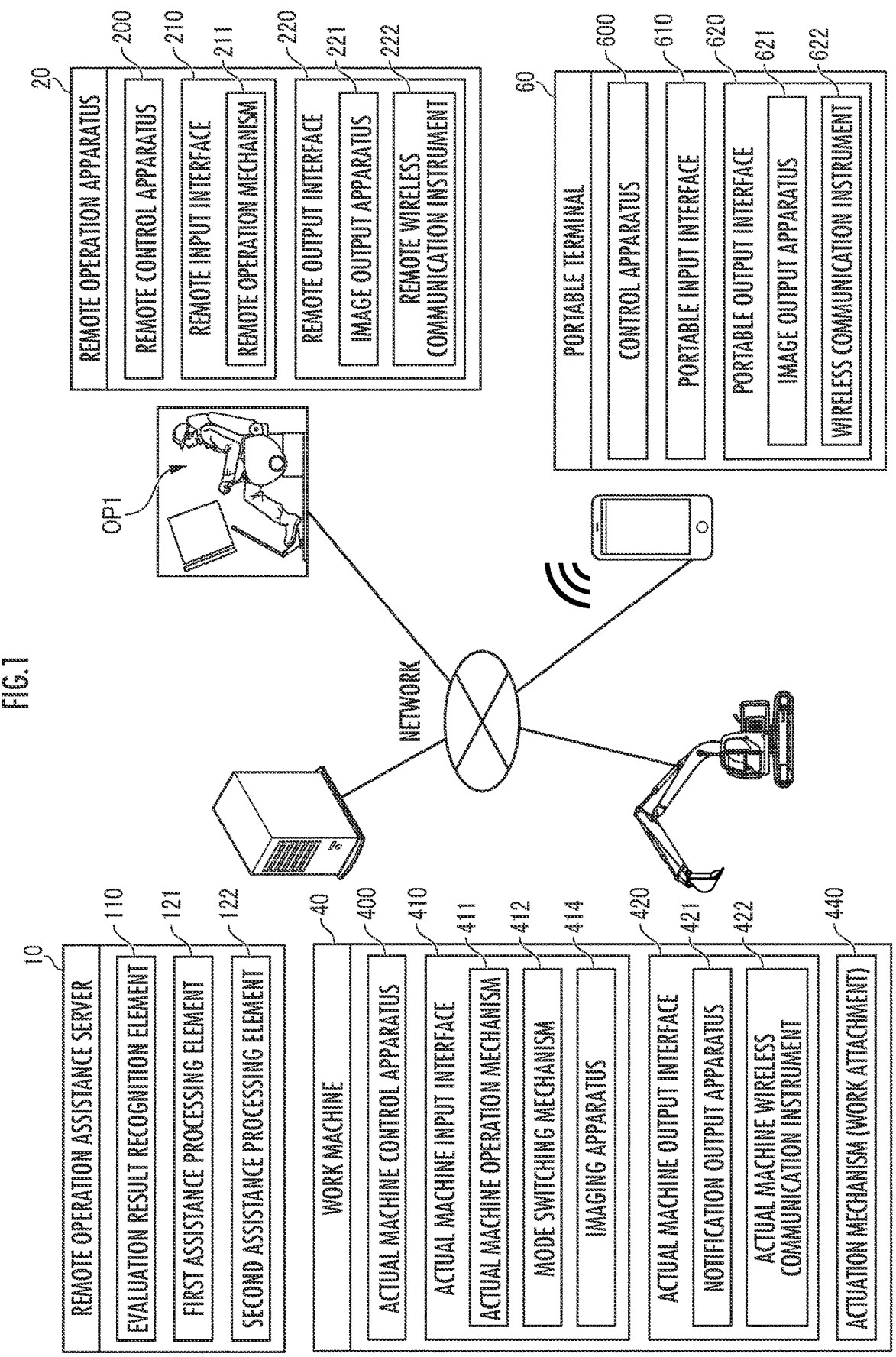
FIG. 1 describes the configuration of a remote operation assistance system as an embodiment of the present invention.

A remote operation assistance system as an embodiment of the present invention shown in FIG. 1 is formed of a remote operation assistance server 10, a remote operation apparatus 20, which is used to remotely operate a work machine 40, and a portable terminal 60.

(Configuration of Remote Operation Assistance Server)

The remote operation assistance server 10 comprises an evaluation result recognition element 110, a first assistance processing element 121, and a second assistance processing element 122. Each of the elements is formed of an arithmetic processing apparatus (single-core processor, multi-core processor, or processor core that form one of processors), reads necessary data and software from a memory or any other storage, and performs arithmetic processing described later and according to the software on the data.

(Configuration of Remote Operation Apparatus)

The remote operation apparatus 20 comprises a remote control apparatus 200, a remote input interface 210, and a remote output interface 220. The remote control apparatus 200 is formed of an arithmetic processing apparatus (single-core processor, multi-core processor, or processor core that form one of processors), reads necessary data and software from a memory or any other storage, and performs arithmetic processing according to the software on the data. The remote input interface 210 comprises a remote operation mechanism 211. The remote output interface 220 comprises an image output apparatus 221 and a remote wireless communication instrument 222.

The remote operation mechanism 211 comprises a travel operation apparatus, a turning operation apparatus, a boom operation apparatus, an arm operation apparatus, and a bucket operation apparatus. The operation apparatuses each comprise operation levers that receive pivotal operation. The operation levers (travel levers) of the travel operation apparatus are operated to move a lower traveler 410 of the work machine 40. The travel levers may also serve as travel pedals. For example, travel pedals fixed to a base or a lower end portion of the travel levers may be provided. An operation lever (turning lever) of the turning operation apparatus is operated to move a hydraulic turning motor that forms a turning mechanism 430 of the work machine 40. An operation lever (boom lever) of the boom operation apparatus is operated to move a boom cylinder 442 of the work machine 40. An operation lever (arm lever) of the arm operation apparatus is operated to move an arm cylinder 444 of the work machine 40. An operation lever (bucket lever) of the bucket operation apparatus is operated to move a bucket cylinder 446 of the work machine 40.

Figure 2:
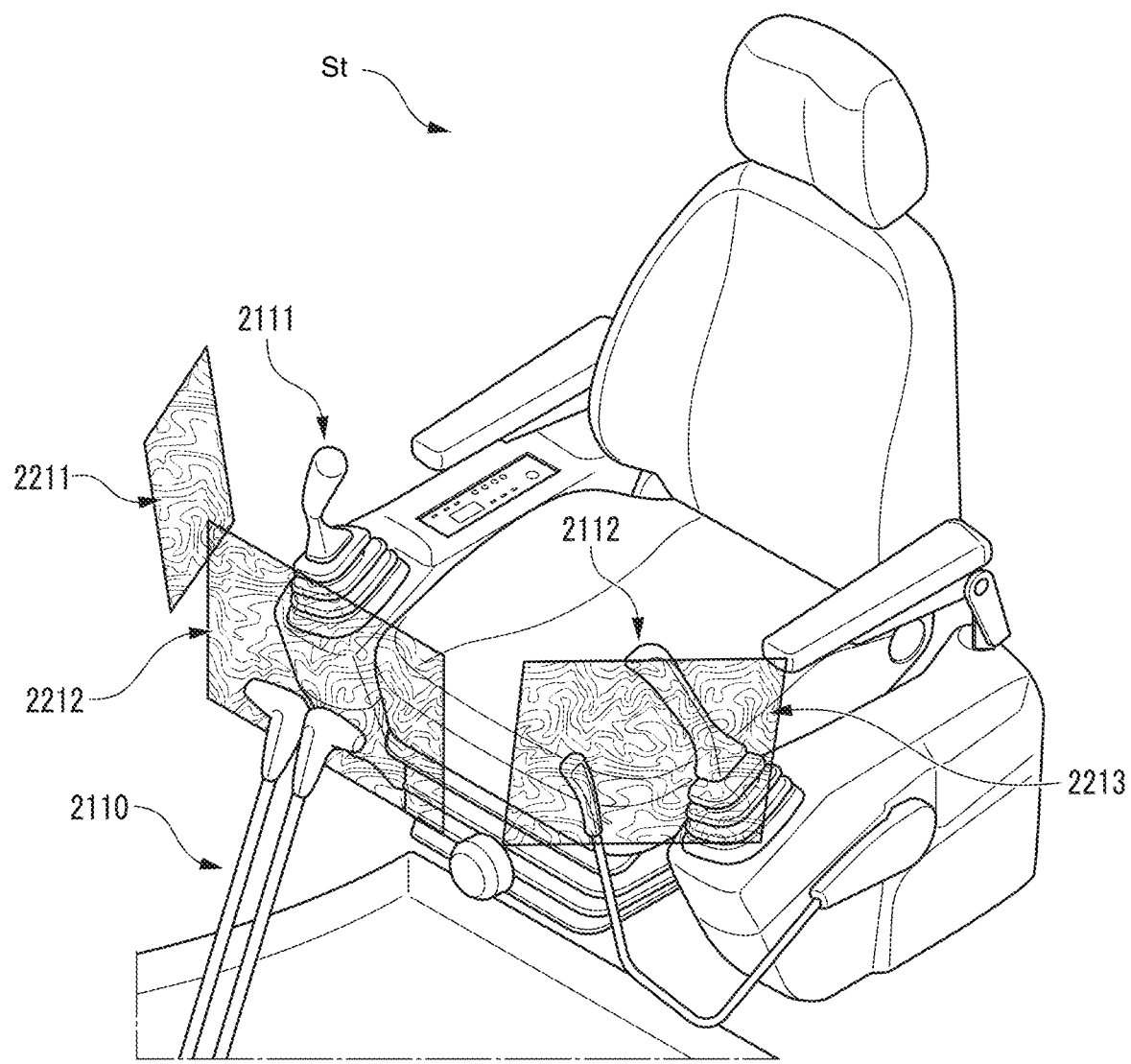
FIG. 2 describes the configuration of a remote operation apparatus.

The operation levers that form the remote operation mechanism 211 are disposed, for example, around a seat St, where an operator is seated, as shown in FIG. 2. The seat St has the form of a high-back chair with armrests, and may instead have any form that allows a remote operator OP1 to be seated, such as the form of a low-back chair without a headrest, or a chair without a backrest.

A pair of right and left travel levers 2110 according to right and left crawlers are disposed sideways on the right and left in front of the seat St. A single operation lever may serve as the plurality of operation levers. For example, a right operation lever 2111 provided in front of a right frame of the seat St shown in FIG. 2 may function as the boom lever when operated in the forward-rearward direction and as the bucket lever when operated in the rightward-leftward direction. Similarly, a left operation lever 2112 provided in front of a left frame of the seat St shown in FIG. 2 may function as the arm lever when operated in the forward-rearward direction and as the turning lever when operated in the rightward-leftward direction. The lever pattern may be arbitrarily changed by the operator's operation instructions.

The image output apparatus 221, for example, is configured with a diagonally right forward image output apparatus 2211, a front image output apparatus 2212 and a diagonally left forward image output apparatus 2213 arranged diagonally right forward of, in front of and diagonally left forward of the seat St, respectively as shown in FIG. 2. The image output apparatuses 2211 to 2213 may each further comprise a loudspeaker (voice output apparatus).

(Configuration of Work Machine)

The work machine 40 comprises an actual machine control apparatus 400, an actual machine input interface 410, an actual machine output interface 420, and an actuation mechanism 440. The work machine control apparatus 400 is formed of an arithmetic processing apparatus (single-core processor, multi-core processor, or processor core that form one of processors), reads necessary data and software from a memory or any other storage, and performs arithmetic processing according to the software on the data.

Figure 3:
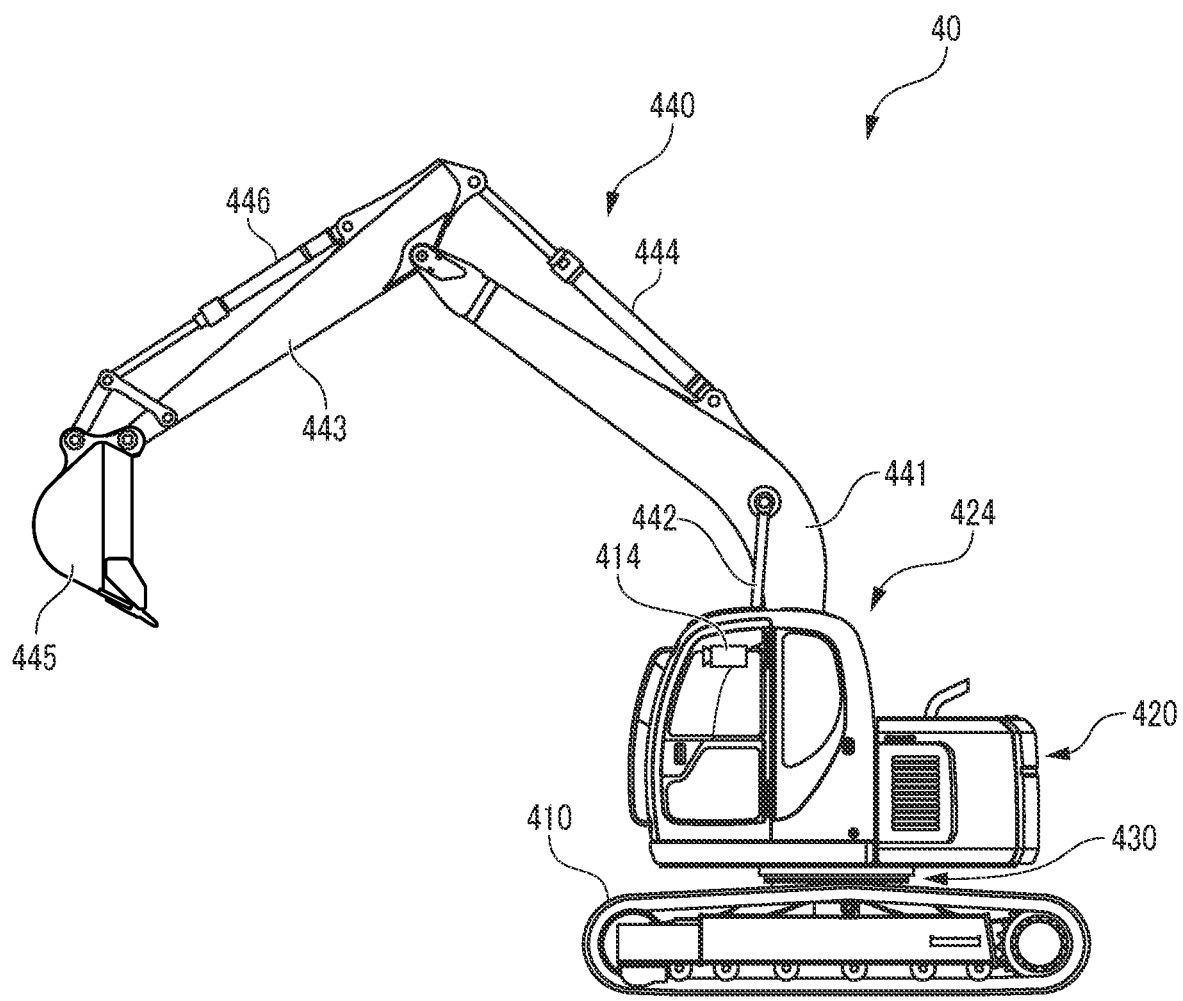
FIG. 3 describes the configuration of a work machine.

The work machine 40 is, for example, a crawler excavator (construction machine), and comprises a crawler-type lower traveler 410 and an upper turner 420, which is turnably mounted on the lower traveler 410 via the turning mechanism 430, as shown in FIG. 3. A cab (driver's chamber) 424 is provided at a front left portion of the upper turner 420. A work attachment 440 is provided at a front center portion of the upper turner 420.

The actual machine input interface 410 comprises an actual machine operation mechanism 411, a mode switching mechanism 412, and an imaging apparatus 414. The actual machine operation mechanism 411 comprises a plurality of operation levers disposed around a seat disposed in the cab 424 in the same manner in which those of the remote operation mechanism 211 are disposed. The cab 424 is provided with a drive mechanism or a robot that receives signals according to the operation aspect of the remote operation levers and moves the actual machine operation levers based on the received signals. The mode switching mechanism 412 is formed of buttons or levers, and a remote operation mode and an actual machine operation mode are switched from one to the other in accordance, for example, with the operation of the buttons. The imaging apparatus 414 is installed, for example, in the cab 424 and captures an image of the environment containing at least part of the actuation mechanism 440 through a windshield of the cab 424.

The actual machine output interface 420 comprises a notification output apparatus 421 and an actual machine wireless communication instrument 422. The notification output apparatus 421 is formed of at least one of a light emitting apparatus, an image output apparatus, and a voice output apparatus, and outputs second notification requesting mode switching operation to the exterior of the work machine 40 or the interior of the cab 424 in a visually and/or aurally recognizable form. The actual machine wireless communication instrument 422 has not only a long-range wireless communication function for communication with a remote base station that communicates with the remote operation assistance server 10 but a short-range wireless communication function for communication with the portable terminal 60. The term "short-range wireless communication" means wireless communication over a relatively short contact making distance (shorter than or equal to 10 m to 20 m, for example), such as NFC used for RFID and Bluetooth ("Bluetooth" is a registered trademark). The term "long-range wireless communication" means wireless communication for communication over a relatively long contact making distance, such as Wi-Fi ("Wi-Fi" is a registered trademark) and mobile phone communication lines.

The work attachment 440 as the actuation mechanism comprises a boom 441, which is attached to the upper turner 420 so as to be movable up and down, an arm 443, which is pivotably linked to the front end of the boom 441, and a bucket 445, which is pivotably linked to the front end of the arm 443. The following components are attached to the work attachment 440: the boom cylinder 442, the arm cylinder 444, and the bucket cylinder 446, which are each formed of an extendable and retractable hydraulic cylinder.

The boom cylinder 442 is interposed between the boom 441 and the upper turner 420 so as to extend or retract when receiving supplied hydraulic fluid to cause the boom 441 to pivot in the up-and-down direction. The arm cylinder 444 is interposed between the arm 443 and the boom 441 so as to extend or retract when receiving supplied hydraulic fluid to cause the arm 443 to pivot around a horizontal axis relative to the boom 441. The bucket cylinder 446 is interposed between the bucket 445 and the arm 443 so as to extend or retract when receiving supplied hydraulic fluid to cause the bucket 445 to pivot around a horizontal axis relative to the arm 443.

(Configuration of Portable Terminal)

The portable terminal 60 is a terminal apparatus that can be carried by a worker, such as a smartphone or a tablet terminal, and comprises a control apparatus 600, a portable input interface 610, and a portable output interface 620. The control apparatus 600 is formed of an arithmetic processing apparatus (single-core processor, multi-core processor, or processor core that form one of processors), reads necessary data and software from a memory or any other storage, and performs the arithmetic processing according to the software on the data.

The portable input interface 610 is formed, for example, of touch-panel-type buttons and switches. The portable output interface 620 comprises an image output apparatus 621 and a wireless communication instrument 622. The image output apparatus 21 comprises a voice output apparatus as required and outputs first notification requesting the mode switching operation and third notification requesting separation from the work machine 40 in a visually and/or aurally recognizable form. The wireless communication instrument 622 has not only the long-range wireless communication function for communication with a remote base station that communicates with the remote operation assistance server 10 but a short-range wireless communication function for communication with the work machine 40.

(Functions)

The functions of the remote operation assistance system having the configuration described above will be described with reference to the flowcharts shown in FIGS. 4 and 5. In the flowcharts, the block "C" is used to simplify the illustration, means transmission and/or receipt of data, specifically, means a conditional branch where a branch direction process is carried out conditional on the transmission and/or receipt of the data.

A state in which each component in the present invention (arithmetic processing resource or hardware resource) "recognizes" information is a concept that encompasses processing for preparing the information in any form usable in subsequent processing, such as receiving the information, reading or retrieving the information from a storage or any other component, writing (storing and holding) or registering the information in the storage or any other component, and estimating, evaluating, identifying, measuring, predicting, or otherwise processing the information by performing arithmetic processing on a signal outputted from a sensor and/or received, retrieved or otherwise acquired basic information in accordance with a predetermined algorithm.

Figure 4:
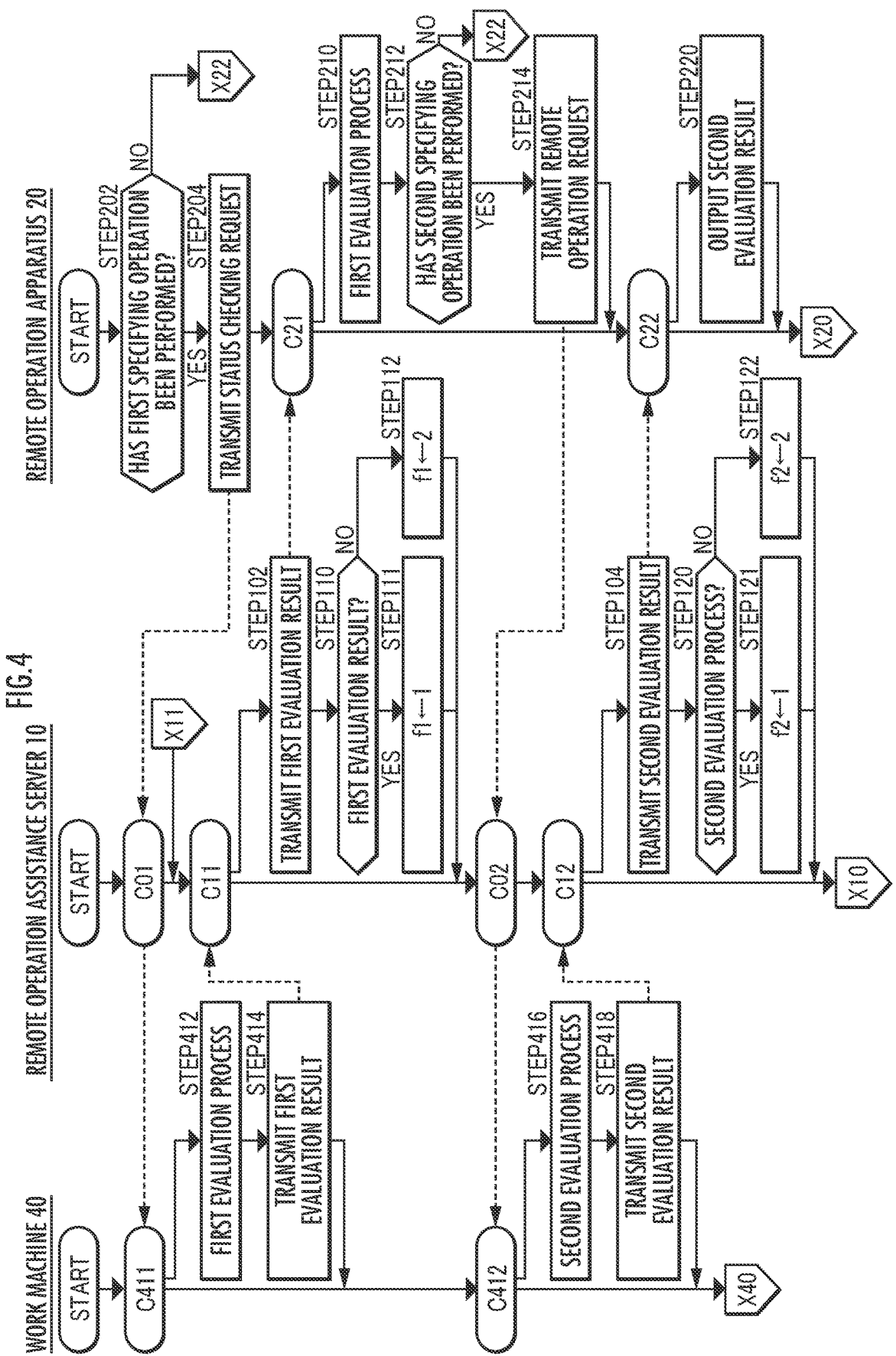
FIG. 4 describes the functions of part of the remote operation assistance system.

First, the remote operation apparatus 20 evaluates whether or not the remote operator OP1 has performed first specifying operation via the remote input interface 210 (STEP 202 in FIG. 4). The "first specifying operation" is, for example, operation performed on a button or an operation lever that forms the remote input interface 210 or the remote operation mechanism 211. When the result of the evaluation is negative (NO in STEP 202 in FIG. 4), the evaluation of whether or not the first specifying operation has been performed and the following processes are repeated. On the other hand, when the result of the evaluation is affirmative (YES in STEP 202 in FIG. 4), a status checking request is transmitted to the remote operation assistance server 10 via the remote wireless communication instrument 222 (STEP 204 in FIG. 4).

In response to the request, when the status checking request is received by the remote operation assistance server 10, the status checking request (or first evaluation result request) is transmitted to the work machine 40 (C01 in FIG. 4).

When the status checking request is received by the work machine 40 via the actual machine wireless communication instrument 422 (C411 in FIG. 4), a first evaluation process is carried out by the actual machine control apparatus 400 (SIFT 412 in FIG. 4). The first evaluation process is the process of evaluating whether or not the operation mode has been switched to the remote operation mode via the mode switching mechanism 412. The first evaluation result is transmitted to the remote operation assistance server 10 via the actual machine wireless communication instrument 422 (SIFT 414 in FIG. 4).

When the first evaluation result is received by the remote operation assistance server 10 (C11 in FIG. 4), the first evaluation result is transmitted to the remote operation apparatus 20 (SIFT 102 FIG. 4). The evaluation result recognition element 110 evaluates whether the first evaluation result is affirmative (remote operation mode) or negative (actual machine operation mode) (STEP 110 in FIG. 4).

When the first evaluation result is affirmative (YES in STEP 110 in FIG. 4), a first flag f1 is set at "1" (SIFT 111 in FIG. 4). On the other hand, when the first evaluation result is negative (NO in STEP 110 in FIG. 4), the first flag f1 is set at "2" (STEP 112 in FIG. 4).

When the first evaluation result is received by the remote operation apparatus 20 via the remote wireless communication instrument 222 (C21 in FIG. 4), the first evaluation result is outputted to the image output apparatus 221, which forms the remote output interface 220 (STEP 210 in FIG. 4). The remote operator OP1 of the remote operation apparatus 20 can therefore recognize whether the work machine 40 has been set to the remote operation mode or the actual machine operation mode.

The remote operation apparatus 20 evaluates whether or not the remote operator OP1 has performed second specifying operation via the remote input interface 210 (STEP 212 in FIG. 4). The "second specifying operation" may, for example, be operation performed on a button or a control lever that forms the remote input interface 210 or the remote operation mechanism 211, and may be operation in the same form of the first specifying operation or different therefrom. When the result of the evaluation is negative (NO in STEP 212 in FIG. 4), the evaluation of whether or not the first specifying operation has been performed and the following processes are repeated. On the other hand, when the result of the evaluation is affirmative (YES in STEP 212 in FIG. 4), a remote operation request is transmitted to the remote operation assistance server 10 via the remote wireless communication instrument 222 (SIFT 214 in FIG. 4).

In response to the request, when the remote operation request is received by the remote operation assistance server 10, the remote operation request (or second evaluation result request) is transmitted to the work machine 40 (CO2 in FIG. 4).

When the remote operation request is received by the work machine 40 via the actual machine wireless communication instrument 422 (C412 in FIG. 4), a second evaluation process is carried out by the actual machine control apparatus 400 (STEP 416 in FIG. 4). The second evaluation process is the process of evaluating whether or not the short-range wireless communication between the work machine 40 and the portable terminal 60 has been established. The second evaluation result is transmitted to the remote operation assistance server 10 via the actual machine wireless communication instrument 422 (SIFT 418 in FIG. 4).

When the second evaluation result is received by the remote operation assistance server 10 (C12 in FIG. 4), the second evaluation result is transmitted to the remote operation apparatus 20 (STEP 104 in FIG. 4). The evaluation result recognition element 110 evaluates whether the second evaluation result is affirmative (whether short-range wireless communication between work machine 40 and portable terminal 60 has been established), or whether the second evaluation result is negative (short-range wireless communication between work machine 40 and portable terminal 60 has not been established) (STEP 120 in FIG. 4).

Figure 6A:
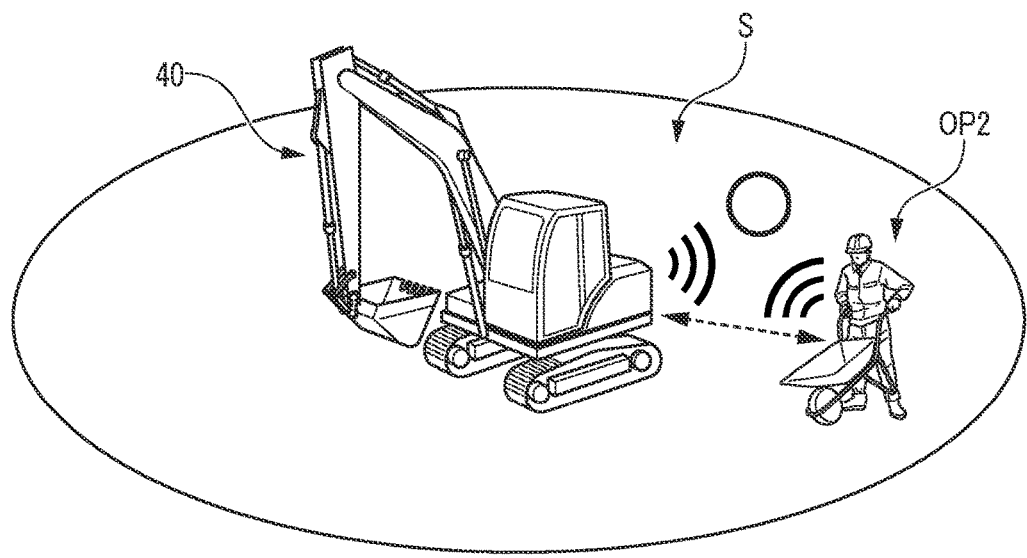
FIG. 6A describes the state in which short-range wireless communication between the work machine and a portable terminal is established.
Figure 6B:
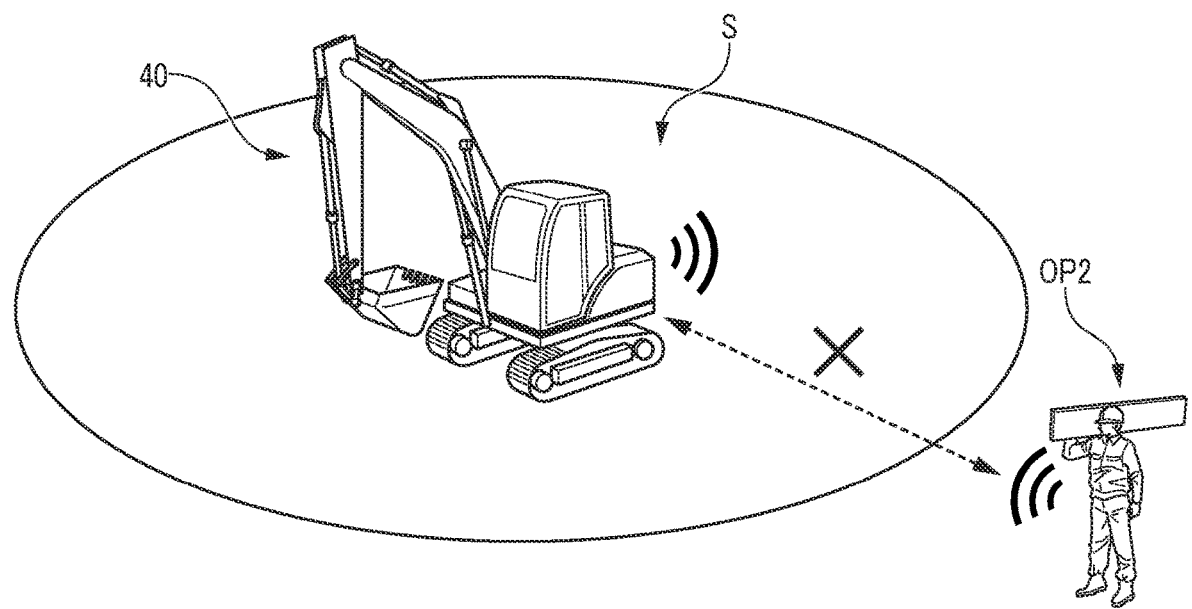
FIG. 6B describes the state in which the short-range wireless communication between the work machine and the potable terminal is not established.

The state in which the short-range wireless communication between the work machine 40 and the portable terminal 60 has been established indicates that it is highly probable that the actual machine operator OP2 (worker) carrying the portable terminal 60 having been powered on and capable of wireless communication is present in an area S, where the short-range wireless communication with respect to the work machine 40 can be performed, as shown in FIG. 6A. The state in which the short-range wireless communication between the work machine 40 and the portable terminal 60 has not been established indicates that it is highly probable that the actual machine operator OP2 (worker) carrying the portable terminal 60 having been powered on and capable of wireless communication is located in a position out of the area S, where the short-range wireless communication with respect to the work machine 40 can be performed, as shown in FIG. 6B.

When the second evaluation result is affirmative (YES in SIFT 120 in FIG. 4), a second flag f2 is set at "1" (STEP 121 in FIG. 4). On the other hand, when the second evaluation result is negative (NO in STEP 120 in FIG. 4), the second flag f2 is set at "2" (SIFT 122 in FIG. 4).

When the second evaluation result is received by the remote operation apparatus 20 via the remote wireless communication instrument 222 (C22 in FIG. 4), the second evaluation result is outputted to the image output apparatus 221, which forms the remote output interface 220 (STEP 220 in FIG. 4). The remote operator OP1 of the remote operation apparatus 20 can thus recognize whether or not the short-range wireless communication between the work machine 40 and the portable terminal 60 has been established, and in turn whether or not a worker carrying the portable terminal 60, such as the actual machine operator OP2, is close enough to the work machine 40 to allow establishment of the short-range wireless communication.

Figure 5:
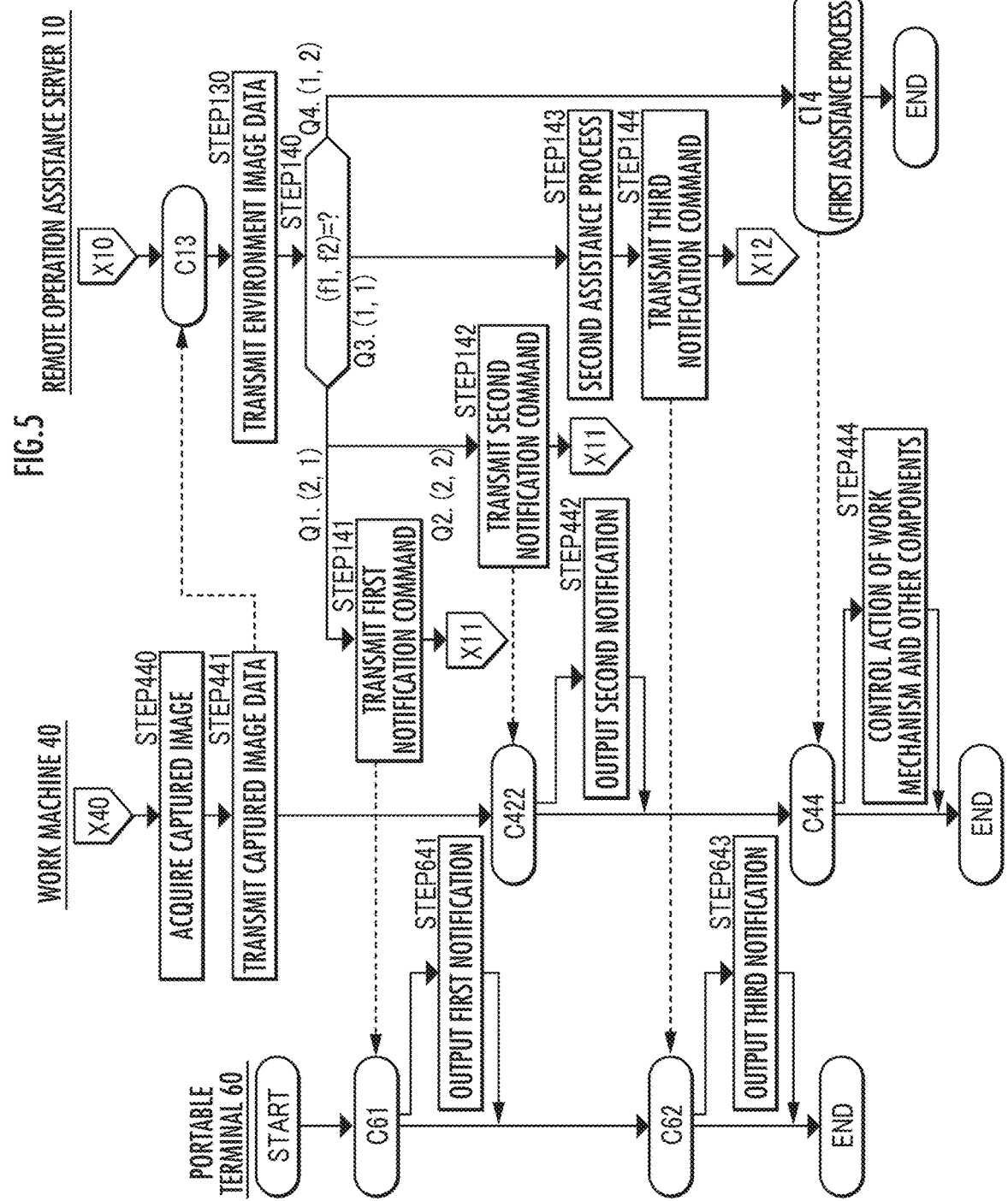
FIG. 5 describes the functions of the rest of the remote operation assistance system.

In the work machine 40, the actual machine control apparatus 400 acquires a captured image via the imaging apparatus 414 (STEP 440 in FIG. 5). The actual machine control apparatus 400 transmits captured image data representing the captured image to the remote operation assistance server 10 via the actual machine wireless communication instrument 422 (STEP 441 in FIG. 5).

When the captured image data is received by the remote operation assistance server 10 (C13 in FIG. 5), environment image data according to the captured image data (data representing all or part of captured image itself or simulated environment image generated based on captured image) is transmitted to the remote operation apparatus 20 (SIFT 130 in FIG. 5).

When the environment image data is received by the remote operation apparatus 20 via the remote wireless communication instrument 222 (C23 in FIG. 5), an environmental image according to the environment image data is outputted to the image output apparatus 221 (STEP 240 in FIG. 5). The environment image, which contains the boom 441, the arm 443, the bucket 445, and the arm cylinder 444, which are part of the work attachment 440 as the actuation mechanism, is thus displayed, for example, on each of the image output apparatus 221 and the second image output apparatus 221.

The remote operation assistance server 10 evaluates the combination of the first flag f1 and the second flag f2 (f1, f2) according to the first and second evaluation results recognized by the evaluation result recognition element 110 (STEP 140 in FIG. 5).

When (f1, f2)=(1, 2) (Q4 in STEP 140 in FIG. 5), a "first assistance process" is carried out by the first assistance processing element 121 (C14 in FIG. 5). The case described above corresponds to a case where the first evaluation result and the second evaluation result recognized by the evaluation result recognition element 110 are affirmative and negative, respectively. The "first assistance process" is a control process of permitting remote operation of the work machine 40 using the remote operation apparatus 20 based on the communication with each of the remote operation apparatus 20 and the work machine 40.

Specifically, in the remote operation apparatus 20, the remote control apparatus 200 recognizes the operation aspect of the remote operation mechanism 211 (STEP 242 in FIG. 5), and a remote operation command according to the operation aspect is transmitted to the remote operation assistance server 10 via the remote wireless communication instrument 222 (STEP 244 in FIG. 5).

When the remote operation command is received by the remote operation assistance server 10, the remote operation command is transmitted to the work machine 40 by the first assistance processing element 121 (C14 in FIG. 5).

In the work machine 40, when an operation command is received by the actual machine control apparatus 400 via the actual machine wireless communication instrument 422 (C44 in FIG. 5), the action of the work attachment 440 and other components is controlled (SIFT 444 in FIG. 5). For example, the bucket 445 is used to scoop soil in front of the work machine 40, the upper turner 420 is turned, and then the bucket 445 is used to drop the soil.

When (f1, f2)=(1, 1) (Q3 in STEP 140 in FIG. 5), a "second assistance process" is carried out by the second assistance processing element 122 (STEP 143 in FIG. 5). In this case, both the first and second evaluation results are affirmative. The "second assistance process" is a control process of prohibiting remote operation of the work machine 40 using the remote operation apparatus 20. For example, based on the communication with the remote operation apparatus 20, the second assistance process prohibits the recognition of the operation aspect of the remote operation mechanism 211 (see STEP 242 in FIG. 5) or the transmission of the operation command (see STEP 244 in FIG. 5). Instead, the second assistance process prohibits the remote operation assistance server 10 from receiving the operation command or the transmission of the operation command to the work machine 40 (see C14 in FIG. 5).

In this case, a third notification command is transmitted by the first assistance processing element 121 to the portable terminal 60 having established the short-range wireless communication with the work machine 40 (STEP 144 in FIG. 5). The transmission of the third notification command corresponds to execution of a "preliminary assistance process". When the third notification command is received by the portable terminal 60 via the wireless communication instrument 622 (C62 in FIG. 5), the third notification requesting separation from the work machine 40 is outputted in a visually and/or aurally recognizable form from the image output apparatus 621, which forms the portable output interface 620, and/or a voice output apparatus.

When (f1, f2)=(2, 1) (Q1 in STEP 140 in FIG. 5), a first notification command is transmitted by the first assistance processing element 121 to the portable terminal 60 having established the short-range wireless communication with the work machine 40 (STEP 141 in FIG. 5). When the first notification command is received by the portable terminal 60 via the wireless communication instrument 622 (C61 in FIG. 5), the first notification requesting switching the operation mode to the remote operation mode is outputted in a visually and/or aurally recognizable form for the actual machine operator OP2 close to the portable terminal 60 from the image output apparatus 621, which forms the portable output interface 620, and/or the voice output apparatus (STEP 641 in FIG. 5).

When (f1, f2)=(2, 2) (Q2 in STEP 140 in FIG. 5), a second notification command is transmitted by the first assistance processing element 121 to the work machine 40 (STEP 142 in FIG. 5). When the second notification command is received by the work machine 40 via the actual machine wireless communication instrument 422 (C422 in FIG. 5), the second notification requesting switching the operation mode to the remote operation mode is outputted in a visually and/or aurally recognizable form for the actual machine operator OP2 outside the work machine 40 or inside the cab 424 from the notification output apparatus 421, which forms the actual machine output interface 420 (STEP 442 in FIG. 5).

Effects

According to the remote operation assistance system having the configuration described above and the remote operation assistance server 10, which forms the remote operation assistance system, in a situation in which the first evaluation result is affirmative and the work machine 40 can be remotely operated via the remote operation apparatus 20, and further in a situation in which the second evaluation result is negative and it is highly probable that a worker carrying the portable terminal 60, such as the actual machine operator OP2, is so far away from the work machine 40 that the short-range wireless communication between the work machine 40 and the portable terminal 60 is not established (see FIG. 6B), remote operation of the work machine is permitted (see Q4 in STEP 140→C14 in FIG. 5).

On the other hand, even in the situation in which the first evaluation result is affirmative and the work machine 40 can be remotely operated via the remote operation apparatus 20, but in a situation in which the second evaluation result is affirmative and it is highly probable that a worker carrying the portable terminal 60, such as the actual machine operator OP2, is so close to the work machine 40 or on the work machine 40 that the short-range wireless communication between the work machine 40 and the portable terminal 60 is established, remote operation of the work machine 40 is inhibited (see Q3 in STEP 140→C143 in FIG. 5, and FIG. 6A).

Remote operation of the work machine 40 performed by the remote operator OP1 can thus be assisted while unexpected situations, such as contact between the work machine 40 and workers outside the work machine 40, are avoided.

In a situation in which the remote operator OP1 has the intention to remotely operate the work machine 40, but is prohibited from doing so because a worker such as the actual machine operator OP2 is close to the work machine 40, remote operation of the work machine 40 may be permitted. Specifically, the "third notification (notification requesting separation from work machine)" is outputted via the portable output interface 620 of the portable terminal 60 in accordance with to the situation (see Q3 in STEP 140→STEP 144→C62→STEP 643 in FIG. 5).

A worker carrying the portable terminal 60, such as the actual machine operator OP2, and close enough to the work machine 40 to allow the short-range wireless communication can thus be requested to move away from the work machine 40 (see FIG. 6A). Thereafter, when the worker moves away from the work machine 40, the following state is achieved: the remote operator OP1 can remotely operate the work machine 40 operating in the remote operation mode (see FIG. 6B).

In a situation in which the remote operator OP1 has the intention to remotely operate the work machine 40, but is inhibited from remotely operating the work machine 40 because the work machine 40 operates in the actual machine operation mode, remote operation of the work machine 40 may be permitted. Specifically, the "first notification (=notification requesting switching operation mode to remote operation mode)" is outputted via the portable output interface 620 of the portable terminal 60 in accordance with the situation (Q1 in STEP 140→STEP 141→C61→STEP 641 in FIG. 5).

A worker carrying the portable terminal 60, such as the actual machine operator OP2, and close enough to the work machine 40 to allow the short-range wireless communication can thus be requested to switch the operation mode to the remote operation mode (see FIG. 6A). Thereafter, when the worker switches the operation mode from the actual machine operation mode to the remote operation mode via the mode switching mechanism 412, which forms the work machine 40, the following state is achieved: the remote operator OP1 can remotely operate the work machine 40.

In the situation in which the remote operator OP1 has the intention to remotely operate the work machine 40, but is inhibited from remotely operating the work machine 40 because the work machine 40 operates in the actual machine operation mode, remote operation of the work machine 40 may be permitted. Specifically, the "second notification (=notification requesting switching operation mode to remote operation mode)" is outputted via the actual machine output interface 420 in accordance with the situation (Q2 in STEP 140→STEP 142→C422→STEP 442 in FIG. 5).

A worker close enough to the work machine 40 to be capable of visual or aural recognition of the notification outputted via the actual machine output interface 420, such as the actual machine operator OP2, can thus be requested to switch the operation mode to the remote operation mode (see FIG. 6B). It does not matter whether or not the worker carries the portable terminal 60. Thereafter, when the worker switches the operation mode from the actual machine operation mode to the remote operation mode via the mode switching mechanism 412, which forms the work machine 40, the following state is achieved: the remote operator OP1 can remotely operate the work machine 40.

Other Embodiments of Present Invention

In the embodiment described above, the remote operation assistance server 10 is formed of one or more servers separately from the remote operation apparatus 20, the work machine 40, and the portable terminal 60 (see FIG. 1), and as another embodiment, the remote operation assistance server 10 may be a component of the remote operation apparatus 20, the work machine 40, or the portable terminal 60. The elements 110, 121, and 122 of the remote operation assistance server 10 may each be a component of intercommunicable two or more of the remote operation apparatus 20, the work machine 40, and the portable terminal 60.

The second assistance processing element 122 may cause, based on communication with the remote operation apparatus 20, the remote output interface 220 of the remote operation apparatus 20 to output the state in which remote operation of the work machine 40 through operation of the remote operation mechanism 211 is prohibited.

The remote operation assistance server 10 having the configuration described above and other components allow the remote operator OP1 to recognize, via the remote output interface 220 of the remote operation apparatus 20, that remote operation of the work machine 40 via the remote operation apparatus 20 is prohibited.

The first assistance processing element 121 may cause, based on communication with the remote operation apparatus 20, the remote output interface 220 of the remote operation apparatus 20 to output the state in which remote operation of the work machine 40 through operation of the remote operation mechanism 211 is permitted and may carry out the first assistance process on the precondition that specifying operation has been issued via the remote input interface 210 of the remote operation apparatus 20.

The remote operation assistance server 10 having the configuration described above and other components allow the remote operator to recognize, via the remote output interface 220 of the remote operation apparatus 20, that remote operation of the work machine 40 via the remote operation apparatus 20 is permitted. Furthermore, depending on whether or not specifying operation has been issued via the remote input interface 210 of the remote operation apparatus 20, and provided that the remote operator OP1's intention to remotely operate the work machine 40 is confirmed, remote operation of the work machine 40 is permitted.

REFERENCE SINGS LIST

10: Remote operation assistance server, 20: Remote operation apparatus, 40: Work machine, 60: Portable terminal, 110: Evaluation result recognition element, 121: first assistance processing element, 122: Second assistance processing element, 210: Remote input interface, 220: Remote output interface, 410: Actual machine input interface, 420: Actual machine output interface, 440: Work attachment (actuation mechanism), 610: Portable input interface, 620: Portable output interface

The invention claimed is:

1. A remote operation assistance server comprising:
an evaluation result recognition element that communicates with a work machine comprising an actual machine operation mechanism and a mode switching mechanism that switches an actual machine operation mode in which the work machine is operated in accordance with an operation aspect of the actual machine operation mechanism to a remote operation mode in which the work machine is operated in accordance with an operation aspect of a remote operation mechanism that forms a remote operation apparatus and vice versa, recognizes as a first evaluation result a result of evaluation of whether or not the mode switching mechanism has switched the operation mode to the remote operation mode, based on the communication, and recognizes as a second evaluation result a result of evaluation of whether or not short-range wireless communication between the work machine and a portable terminal has been established, based on the communication;
a first assistance processing element that carries out a first assistance process of permitting remote operation of the work machine using the remote operation apparatus based on communication with each of the remote operation apparatus and the work machine when the first evaluation result recognized by the evaluation result recognition element is affirmative and the second evaluation result recognized by the evaluation result recognition element is negative; and
a second assistance processing element that carries out a second assistance process of prohibiting remote operation of the work machine using the remote operation apparatus when the first and second evaluation results recognized by the evaluation result recognition element are affirmative.

2. The remote operation assistance server according to claim 1,
wherein when the first assistance processing element receives a request for remote operation of the work machine from the remote operation apparatus, and the first and second evaluation results recognized by the evaluation result recognition element are affirmative, the first assistance processing element carries out a preliminary assistance process of causing an output interface that forms the portable terminal to output notification requesting separation from the work machine in a visually or aurally recognizable form based on communication with the portable terminal.

3. The remote operation assistance server according to claim 1,
wherein when the first assistance processing element receives a request for remote operation of the work machine from the remote operation apparatus, and the first evaluation result recognized by the evaluation result recognition element is negative and the second evaluation result recognized by the evaluation result recognition element is affirmative, the first assistance processing element carries out a preliminary assistance process of causing an output interface that forms the portable terminal to output notification requesting mode switching operation in a visually or aurally recognizable form based on communication with the portable terminal.

4. The remote operation assistance server according to claim 1,
wherein when the first assistance processing element receives a request for remote operation of the work machine from the remote operation apparatus, and the first evaluation result recognized by the evaluation result recognition element is negative and the second evaluation result recognized by the evaluation result recognition element is affirmative, the first assistance processing element carries out a preliminary assistance process of causing an output interface that forms the work machine to output notification requesting mode switching operation in a visually or aurally recognizable form based on communication with the work machine.

5. The remote operation assistance server according to claim 1,
wherein the second assistance processing element causes, based on communication with the remote operation apparatus, the output interface of the remote operation apparatus to output a state in which remote operation of the work machine through operation of the remote operation mechanism is prohibited.

6. The remote operation assistance server according to claim 1,
wherein the first assistance processing element causes, based on communication with the remote operation apparatus, an output interface of the remote operation apparatus to output a state in which remote operation of the work machine through operation of the remote operation mechanism is permitted, and carries out the first assistance process on a precondition that specifying operation has been issued via an input interface of the remote operation apparatus.

7. A remote operation assistance system comprising: the remote operation assistance server according to claim 1; the work machine; and the portable terminal.

8. A remote operation assistance method, the method carrying out:
an evaluation result recognition process of communicating with a work machine comprising an actual machine operation mechanism and a mode switching mechanism that switches an actual machine operation mode in which the work machine is operated in accordance with an operation aspect of the actual machine operation mechanism to a remote operation mode in which the work machine is operated in accordance with an operation aspect of a remote operation mechanism that forms a remote operation apparatus and vice versa, recognizing as a first evaluation result a result of evaluation of whether or not the mode switching mechanism has switched the operation mode to the remote operation mode, based on the communication, and recognizing as a second evaluation result a result of evaluation of whether or not short-range wireless communication between the work machine and a portable terminal has been established, based on the communication;
a first assistance process of carrying out a first assistance process of permitting remote operation of the work machine using the remote operation apparatus based on communication with each of the remote operation apparatus and the work machine when the first evaluation result recognized in the evaluation result recognition process is affirmative and the second evaluation result recognized in the evaluation result recognition process is negative; and
a second assistance process of carrying out a second assistance process of prohibiting remote operation of the work machine using the remote operation apparatus when the first and second evaluation results recognized in the evaluation result recognition process are affirmative.

* * * * *